United States Patent
Huynh et al.

(10) Patent No.: US 7,730,298 B2
(45) Date of Patent: Jun. 1, 2010

(54) METHOD AND APPARATUS FOR TRANSLATING INFORMATION BETWEEN COMPUTERS HAVING DIFFERENT SECURITY MANAGEMENT

(75) Inventors: Yen Luong Huynh, Sammamish, WA (US); Sean Allan MacLellan, Renton, WA (US); Andrew James Dent, Mercer Island, WA (US)

(73) Assignee: Hubspan Inc., Seattle, WA (US)

( * ) Notice: Subject to any disclaimer, the term of this patent is extended or adjusted under 35 U.S.C. 154(b) by 914 days.

(21) Appl. No.: 10/994,921

(22) Filed: Nov. 22, 2004

(65) Prior Publication Data

US 2006/0112265 A1   May 25, 2006

(51) Int. Cl.
*H04L 29/06* (2006.01)
(52) U.S. Cl. ................. 713/153; 713/155; 713/180; 380/28
(58) Field of Classification Search ................. 713/153, 713/180; 380/28
See application file for complete search history.

(56) References Cited

U.S. PATENT DOCUMENTS

| | | | | |
|---|---|---|---|---|
| 5,548,646 | A * | 8/1996 | Aziz et al. ................. | 713/153 |
| 5,898,784 | A * | 4/1999 | Kirby et al. ................. | 713/153 |
| 6,084,969 | A * | 7/2000 | Wright et al. ............... | 380/271 |
| 6,367,012 | B1 * | 4/2002 | Atkinson et al. ............ | 713/176 |
| 6,560,581 | B1 * | 5/2003 | Fox et al. ...................... | 705/51 |
| 6,751,728 | B1 * | 6/2004 | Gunter et al. ............... | 713/153 |
| 7,028,182 | B1 * | 4/2006 | Killcommons ............... | 713/161 |
| 7,065,213 | B2 * | 6/2006 | Pinder ......................... | 380/240 |
| 7,363,495 | B2 * | 4/2008 | Felt et al. ..................... | 713/170 |
| 2003/0101339 | A1 * | 5/2003 | Bianchini et al. ........... | 713/153 |
| 2005/0169473 | A1 * | 8/2005 | Candelore ................... | 380/239 |
| 2005/0198492 | A1 * | 9/2005 | Gaur et al. .................. | 713/153 |
| 2006/0285686 | A1 * | 12/2006 | Van Den Heuvel et al. . | 380/200 |

* cited by examiner

*Primary Examiner*—Kambiz Zand
*Assistant Examiner*—Amare Tabor
(74) *Attorney, Agent, or Firm*—Steven C. Stewart

(57) ABSTRACT

A system and method for communicating information between multiple locations. A computer receives, via a network, information signed and/or encrypted at a first location in accordance with a first signing and encryption methodology. The information is decrypted and the signatures of the information are validated using the first signing and/or encrypting methodology. The information is re-signing and/or re-encrypting with a second signing and encryption methodology such that the information can be decrypted and/or its signatures validated at a second location. The information is then transmitted to the second location via a network.

31 Claims, 2 Drawing Sheets

METHOD AND APPARATUS FOR TRANSLATING INFORMATION BETWEEN COMPUTERS HAVING DIFFERENT SECURITY MANAGEMENT

FIELD OF THE INVENTION

These claimed embodiments relate to the field of translating security information when such information is being transferred between multiple computers.

BACKGROUND

A method and apparatus for translating security information between computers is disclosed.

Communicating with computers, such as those of financial institutions or any corporation transferring secure information, requires that to transmit information from one computer to another, certain security measures are present. For example, the document being sent must be signed and encrypted in accordance with the rules of the corporation. Further, the protocol to transfer the file must be authenticated per the corporation's specifications.

When one corporation needs to transfer information to another corporation having different authentication and encryption requirements, one corporation must change its authentication methodology. Alternatively, one of the corporations may be required to adopt a special authentication methodology to enable communication. These changes can significantly increase the cost to the institution as it typically has specific authentication and encryption methods as part of its infrastructure.

SUMMARY OF THE INVENTION

A method for communicating between a first computer or a server disposed at a first location with a second computer or server disposed at a second location is disclosed. The method may include receiving via a network by an intermediate computer a document signed and/or encrypted at the first location in accordance with a first signing and/or encryption methodology. The document may be automatically decrypted and/or its signature validated using the first signing and encrypting methodology. The decrypted and validated document may be automatically re-signed and/or re-encrypted with a second signing and encryption methodology such that the document can be decrypted and validated at a second location. The re-signed and/or re-encrypted document may be transmitted to the second location via a network.

DESCRIPTION OF THE FIGURES

FIG. 2A is the method executed using CPU 16a in computer 12a, FIG. 2B by CPU 16b in computer 12b and FIG. 2C by CPU 16c in computer 12c.

DESCRIPTION OF THE PREFERRED EMBODIMENTS

Figure 1:
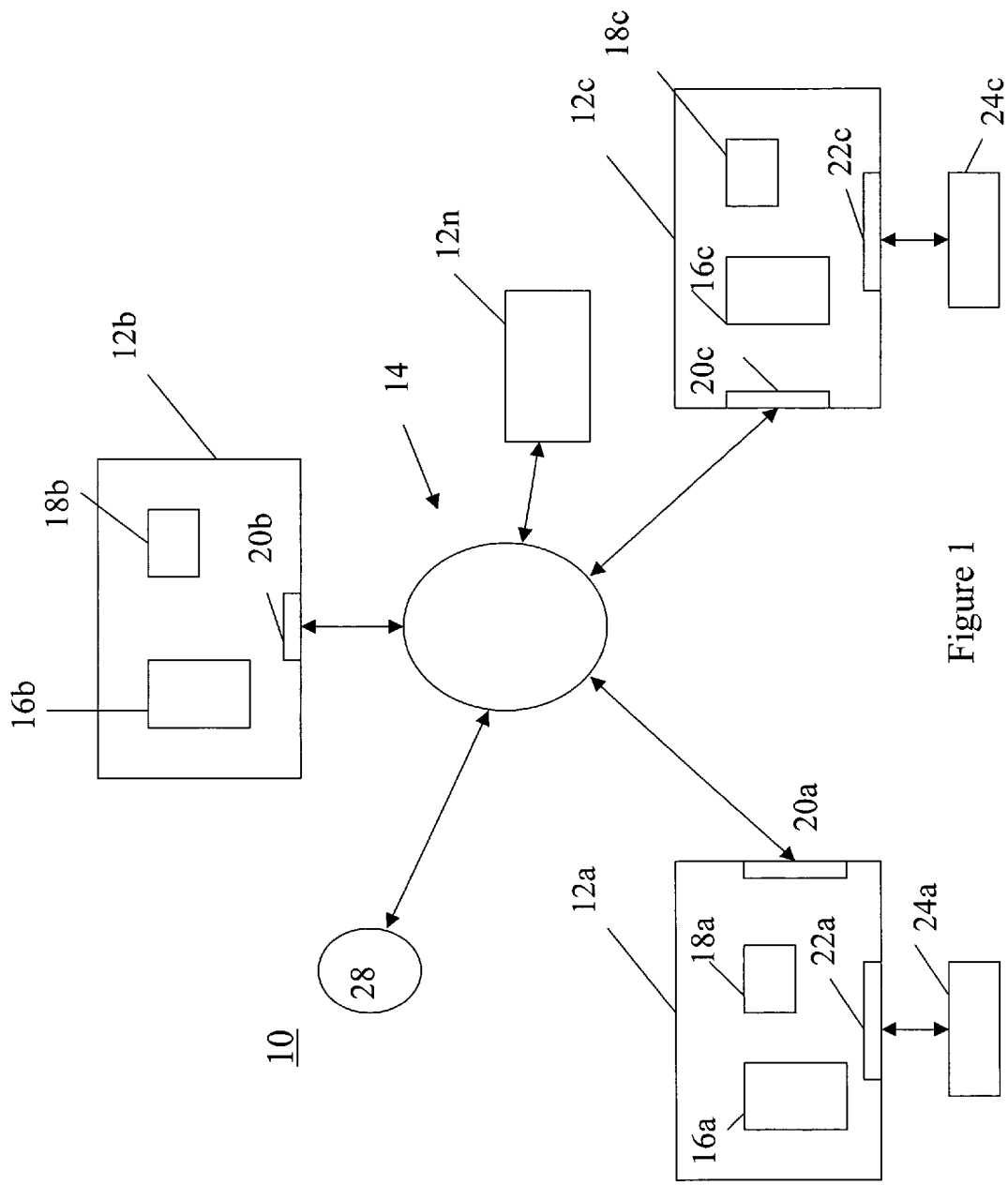
FIG. 1 is a simplified schematic diagram of a system for transferring information between computer systems.

Referring to FIG. 1 there is shown system 10 having a first electronic device or computer 12a at a first location coupled via network 14 to computers 12b and 12c preferably located remotely from each other and computer 12a. First computer 12a, intermediate computer 12b and second computer 12c are constructed using materials, processes and techniques generally known in the art, and may include conventional components such as, but not limited to, a CPU's 16a-c coupled to memory 18 a-c, and network interface device 20a-c respectively. CPU 16a-c executes instructions stored in memory 18a-18c respectively. Such instructions are described in more detail in FIG. 2A-2C.

Computer 12 a & 12 c may include an I/O device interface 22a & 22c respectively coupled to I/O device 24a and 24c. I/O device 24a and 24c may include, but are not limited to a monitor, keyboard and mouse, or any device for enabling a user to enter information into computer 22a and 22c respectively, and enable the user to preview information being stored or processed by computer 12a and 12c.

CPU 16a-c may include a motherboard circuit for communicating with Memory 18 a-c, may include, but are not limited to one or more of the following, an optical drive, hard drive, Random Access memory device. Network interface 20a enables computer 12a to connect to other computers 12 b and 12c via network 14. Although system 10 is shown with computer 12b coupled to computers 12a and 12c, computer 12b may be coupled with many other computers 12n, or coupled through network 14 to other computer networks 28.

Computers 12a-12n may communicate via ISO (International Standard Organization), ITU (International Telecommunications Union) or IEEE (Institute for Electrical and Electronic Engineers) standards based network 14 or any proprietary network using structures, protocols and layouts including but not limited to TCP, Ethernet, cellular, microwave, fiber, broadband, baseband, wireless, IEEE 802.11, etc. Network 14 may be an Internet, World Wide Web, intranet, or any combination thereof.

Figure 2C:
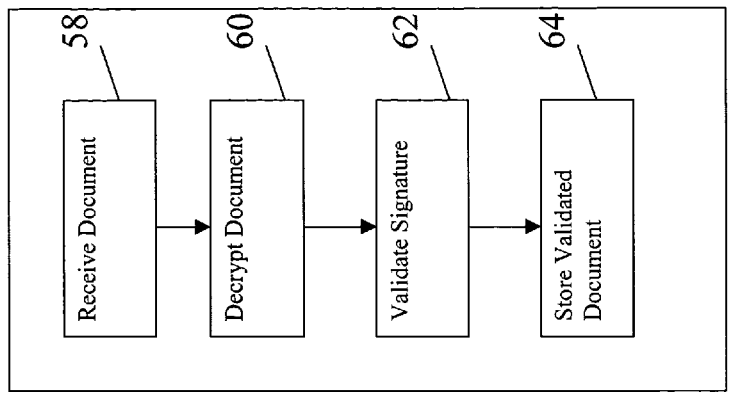
FIGS. 2A-2C are flow charts disclosing a method for transferring secure documents between multiple computing devices, where
Figure 2B:
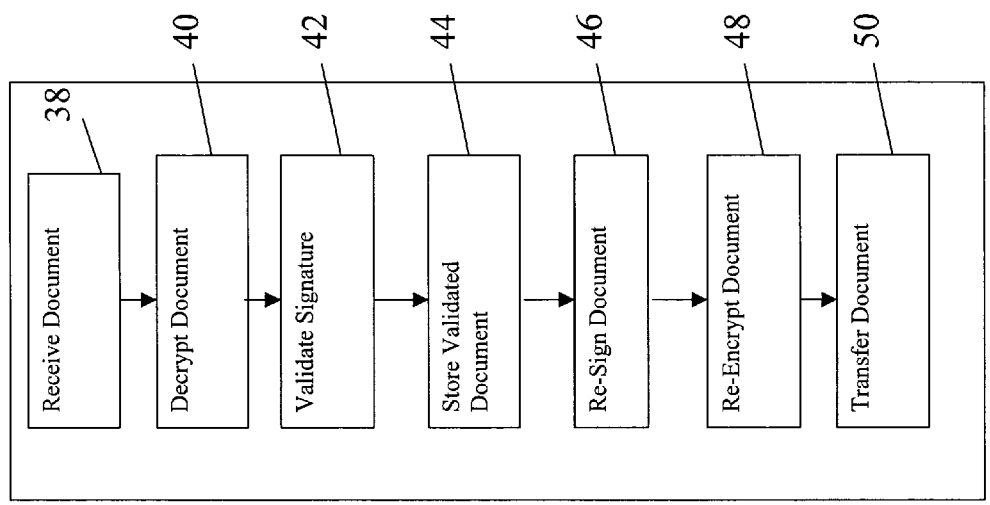
Figure 2A:
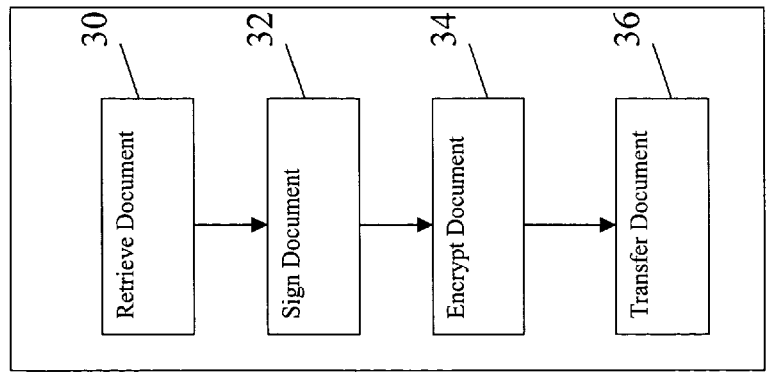

Referring to FIG. 2A, there is shown the method executed by first computer 12a. Computer 12a in step 30 retrieves a document previously stored in memory 18a. Although a document is specifically mentioned in describing the preferred embodiments, it is contemplated that document may include one or more documents, any type of information, including text, algorithms, audio/video data, symbolic and numerical information. Such document is typically transferred to memory 18a using generally accepted methods, such as being entered from I/O device 24a or being transferred from other computers (not shown) coupled to network 14 using Hyper Text transfer protocols (HTTP), FTP (File Transfer Protocol), or any generally known protocol.

In step 32, the retrieved document may be signed by computer 12a using generally known signing digest algorithms including but not limited to MD5 hashing algorithm, SHA-1 hashing algorithm, Elliptic Curve Digital Signature Algorithm (ECDSA). Further details of MD5 and SHA-1 digest algorithms are disclosed in IETF RFC 2014, which is hereby incorporated by reference. Further details of ECDSA are disclosed in IETF RFC 3278, which is hereby incorporated by reference. If the document is signed, the private keys used to sign the document may have been previously provided to computer 12a.

Signer certificates containing the public keys that correspond to the private keys used during signing may be embedded in the signed document. The signed document may be formatted with an encoding scheme including but not limited to standard cryptographic message syntax (CMS). The signing and CMS formatting process is described in IETF RFC 3852, which is hereby incorporated by reference.

When signer certificates are embedded in the document during signing, the signer certificates may not need to be pre-exchanged with computer 12b as discussed herein. Otherwise, signer certificates used to sign the document must be pre-exchanged between computer 12a and 12b, so that 12b can ascertain which certificates to use when verifying the signatures of the document (as explained herein).

In step 34, the signed document may be encrypted using standard encryption algorithms using previously provided public keys stored in memory of computer 12a. Examples of encryption algorithms include but are not limited to Triple DES, AES-128, AES-192, AES-256, CAST128, CAST256, RC2-40, and RC2-128.

The public keys used by computer 12a to encrypt the document are known to computer 12b since computer 12b has the corresponding private keys, which enables computer 12b to decrypt the document. The encrypted document may be formatted with an encoding scheme including but not limited to standard CMS. The encryption and CMS formatting process is described in IETF RFC 3852, which is hereby incorporated by reference.

The encrypted document may be stored in memory 18a, and in step 36 the encrypted document may be transferred via interface 20a via network 14 to computer 12b. The wire protocol for transferring of the encrypted and/or signed document can be any generally known protocol including but not limited to HTTP, FTP or SMTP (EMAIL). Details of such protocols are described in HTTP 1.1, HTTP1.0, FTP and SMTP (EMAIL), which are hereby incorporated by reference.

The cryptographic message syntax scheme defines the manner in which the document is signed and encrypted, encrypted and not signed, or signed and not encrypted, the encryption algorithms and key lengths, the signing digest algorithms, signers' information and signer certificates embedment information. Although the document may be signed per step 32 or encrypted in step 34, steps 32 and/or 34 are optional and the document transferred to computer 12b may contain any cryptographic message syntax encoding schemes including not being signed and/or encrypted.

Referring to FIG. 2B, intermediate computer 12b receives the encrypted (if encrypted in step 34) document from computer system 12a in step 38 and stores the document in memory 18b. Step 38 preferably may be initiated when the encrypted document is available from computer 12a.

The received encrypted document (if encrypted in step 34) may be decrypted in step 40 using the same cryptographic algorithm used to encrypt the document by computer system 12a. Preferably the decryption algorithm may be indicated by metadata in the CMS format included with the received document or the algorithm may be previously known by computer 12b.

Computer 12b may, in step 42, validate the signatures of the decrypted document (if the document was signed in step 32). The signatures may be validated using the embedded certificates or certificates containing the public keys provided by computer 12a, or a trusted certificate issuing authority. The certificates containing the public keys used in validating the signatures may also be checked against one or more Certificate Revocation Lists (CRL). Details of CRL and its format are described in IETF RFC2459, which is hereby incorporated by reference. Alternatively, the certificates may also be verified using Online Certificate Status Protocol (OCSP) against its issuing Certificate Authority. Details of OCSP are described in IETF RFC2560, which is hereby incorporated by reference.

If the certificates are still valid and the document has valid signatures, the document may be stored in memory 18b in validation step 44 or by a validation circuit. If the document is determined not to be valid, or contains invalid certificates, an error may be transferred to computer 12a and an indication of such error may be logged into memory 18b within computer 12b in step 44. In step 44, such error indication may be provided to another computer on the network 14 or signaled to a user using conventional means.

Once the validated document is stored in memory 18b, the document could be in the clear, containing no signing or encryption. This clear document may optionally be re-signed in step 46 using generally known signing digest algorithms including but not limited to MD5 hashing algorithm, SHA-1 hashing algorithm, Elliptic Curve Digital Signature Algorithm (ECDSA). Further details of MD5 and SHA-1 digest algorithms are disclosed in IETF RFC 2014, which is hereby incorporated by reference. Further details of ECDSA are disclosed in IETF RFC 3278, which is also hereby incorporated by reference. If the document is signed, the private keys used to sign the document may have been previously provided to computer 12b.

Signer certificates containing the public keys that correspond to the private keys used during signing may be embedded in the signed document. The signed document may be formatted with an encoding scheme including but not limited to standard cryptographic message syntax (CMS). The signing and CMS formatting process is described in IETF RFC 3852, which is hereby incorporated by reference.

When signer certificates are embedded in the document during signing, the signer certificates may not need to be pre-exchanged with computer 12c as discussed herein. Otherwise, signer certificates used to re-sign the document must be pre-exchanged between computer 12b and 12c, so that computer 12c can ascertain which certificates to use when verifying the signatures of the document (as explained herein). The signing digest algorithms, signer certificates embedding process and encoding scheme format used during re-signing may be different than the ones that were originally used in step 32 by computer 12a.

In step 48, the document may optionally be re-encrypted using standard encryption algorithms. Examples of such encryption algorithms include but are not limited to Triple DES, AES-128, AES-192, AES-256, CAST128, RC2-40, and RC2-128. The public keys used by computer 12b to encrypt the document may be known to computer 12c since 12c has the corresponding private keys, which enable computer 12c to decrypt the document. The encrypted document may be formatted with an encoding scheme including but not limited to standard CMS. The encryption and CMS formatting process is described in IETF RFC 3852, which is hereby incorporated by reference.

The encryption algorithms, the length of the encryption keys, and encoding scheme format used during re-encryption may be different than the ones that were originally used in step 34 by computer 12a.

The encrypted document may then be stored in memory 18b, and in step 50 transferred via interface 20b via network 14 to computer 12c. The cryptographic message syntax scheme defines the manner in which the document is signed and encrypted, encrypted and not signed, or signed and not encrypted, the encryption algorithms and key lengths, the signing digest algorithms, signers' information and signer certificates embedment information. Although the document may be re-signed per step 46 or re-encrypted in step 48, steps 46 and/or 48 are optional and the document transferred to computer 12c may contain any cryptographic message syntax encoding schemes including not being signed and/or encrypted.

The wire protocol for transferring of the encrypted and/or signed document can be any generally known protocol including but not limited to HTTP, FTP or SMTP (EMAIL). Details of such protocols are described in HTTP 1.1, HTTP1.0, FTP and SMTP (EMAIL), which are hereby incorporated by reference. Steps 38 through 50 may be executed continuously and automatically without any user intervention.

Referring to FIG. 2C, computer 12c receives in step 58 the encrypted document (if encrypted in step 48) from computer system 12b and stores the document in memory 18c.

The received encrypted document (if encrypted in step 48) may be decrypted in step 60 using the same cryptographic algorithm used to encrypt the document by computer system 12b in step 48. Preferably the decryption algorithm is indicated by metadata in the CMS format included with the received document or the algorithm may be previously known by computer 12c.

Computer 12c in step 62 may validate the signature of the decrypted document (if signed in step 46). The signatures may be validated using the embedded certificates or certificates containing the public keys provided by computer 12b, or a trusted certificate issuing authority. The certificates containing the public keys used in validating the signatures may also be checked against one or more Certificate Revocation Lists (CRL). Details of CRL and its format are described in IETF RFC2459, is hereby incorporated by reference. Alternatively, the certificates may also be verified using Online Certificate Status Protocol (OCSP) against its issuing Certificate Authority. Details of OCSP are described in IETF RFC2560, which is hereby incorporated by reference.

If the certificates are still valid and the document has valid signatures, the document may be stored in memory 18c in validation step 64. If the document is determined not to be valid or contains an invalid certificate, an error is sent to computer 12a and/or 12b and an indication of such error is logged within computer 12c. Such error indication may be provided to another computer via network 14 or signaled to a user using conventional means.

Although the preferred embodiments describe transferring a document from computer 12a to 12c, such document may be transferred from computer 12c to computer 12a using the methods shown in FIGS. 2A-C, where computer 12c implements the methods shown in FIG. 2A and computer 12a implements the methods shown in FIG. 2C. Also the process described in this specification discloses translating one document between multiple computers; the process could further translate multiple documents, and transmit each of the multiple translated documents to one or more computers from an intermediate computer such that each of the documents is translated at the intermediate computer with a different signing or encryption scheme.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method for communicating with an intermediate computer coupled between a first computer disposed at a first location and a second computer disposed at a second location, the method comprising:

receiving, by the intermediate computer from the first computer via a network, a document signed and encrypted at the first location in accordance with a first signing and a first encryption algorithm;

decrypting the received document, by the intermediate computer, in accordance with the first encryption algorithm to obtain a decrypted received document and a received signature;

computing, by the intermediate computer using the first signing algorithm, a signature from a value derived from the decrypted received document;

verifying the decrypted received document, by the intermediate computer, by comparing the received signature with the computed signature;

determining, by the intermediate computer, a second signing and a second encryption algorithm used by the second computer at a second location to decrypt and to verify the document;

re-signing and re-encrypting, by the intermediate computer, the verified decrypted received document with the determined second signing and the second encryption algorithm; and transmitting, by the intermediate computer, the re-signed and re-encrypted document to the second computer at the second location via said network or a second network.

2. The method as recited in claim 1, further comprising providing an error indication from the intermediate computer to the first computer in the event of one or more events occur on the intermediate computer from the group comprising:

a) detection of an invalid signature of the document;
b) revoked certificate detected in the CRL;
c) absence of embedded signer certificate when an embedded certificate was expected;
d) Failure to re-sign the document; and
e) Failure to re-encrypt the document.

3. The method as recited in claim 1 wherein the document is re-encrypted using an algorithm different from the algorithm used to encrypt the document.

4. The method as recited in claim 1 wherein the document is signed by the first computer using a first signing digest algorithm and wherein the verified decrypted received document is re-signed by the intermediate computer using a second signing digest algorithm, and wherein the first signing digest algorithm used to sign the document is different from the second signing digest algorithm used to re-sign the verified decrypted received document.

5. The method as recited in claim 1 wherein the received document includes a message syntax encoding scheme different from the message syntax encoding scheme of the transmitted document.

6. The method as recited in claim 1 wherein the received document is verified with the intermediate computer using a key from a trusted Certificate Authority and the transmitted document is encrypted or signed with the intermediate computer using a key from a different trusted Certificate Authority.

7. The method as recited in claim 1 wherein the document is signed with an embedded certificate and re-signed without an embedded certificate, or signed without and embedded certificate and re-signed with an embedded certificate.

8. An intermediate computer apparatus for transferring a signed and encrypted document via a network between a first electronic device disposed at a first location with a second electronic device disposed at a second location, the intermediate computer apparatus comprising:

a receiver operative to receive via the network the signed document from the first electronic device disposed at the first location;

a validator operative to validate the received document;

a signor operative to determine an algorithm used by the second electronic device to sign the document and to re-sign the validated received document using the determined algorithm; and a transmitter operative to transmit the re-signed document via the network to the second electronic device disposed at the second location.

9. The apparatus as recited in claim 8, wherein transmitter is operative to transmit the re-signed document to the second electronic device via the network based on signing information provided to the intermediate computer by the second electronic device, and wherein the first location is different from the second location.

10. The apparatus as recited in claim 8 wherein the document is signed using a first digest algorithm and the validated received document is re-signed using a second signing digest algorithm, and wherein the signing digest algorithm used to sign the document is different from the signing digest algorithm used to re-sign the validated received document.

11. The apparatus as recited ill claim 8 wherein tile received document includes a message syntax encoding scheme different from the message syntax encoding scheme of the transmitted document.

12. The apparatus as recited in claim 8 wherein the received document is validated using a trusted Certificate Authority and the transmitted document is signed with a key from a different trusted Certificate Authority, and wherein the validator is operable to validate the received document by looking up the received a certificate associated with the received document in a certificate revocation list.

13. A computer media having instruction that when executed by an intermediate computer comprise the method of:

receiving at a first location via a network a document signed and encrypted in accordance with a first signing and encryption algorithm;

decrypting at the first location the document and validating the signature of the document using the first encryption and signing algorithm respectively;

re-signing and re-encrypting the decrypted and validated document at the first location with a second encryption and a second signing algorithm respectively such that the document can be decrypted and validated at a second location, the second location for the second signing or encryption being different from the first algorithm: and transmitting from the first location the re-signed and re-encrypted document to a second computer via said network.

14. The computer media as recited in claim 13, further comprising the method of providing an error indication upon detection of an invalidated signature of the document.

15. The computer media as recited in claim 13 wherein the document is signed and re-signed using a signing digest algorithm, and wherein the signing digest algorithm used to sign the document is different from the signing digest algorithm used to re-sign the document.

16. The computer media as recited in claim 13 wherein the received document includes a message syntax encoding scheme different from the message syntax encoding scheme of the transmitted document.

17. The computer media as recited in claim 13 wherein the received document is verified at the first location using a key from a trusted Certificate Authority and the transmitted document is encrypted and signed at the first location with a key from a different trusted Certificate Authority.

18. The computer media as recited in claim 13 wherein the received document is re-encrypted using a key having a different length than the key used to encrypt the transmitted document.

19. The computer media as recited in claim 13 wherein the document is signed with an embedded certificate and re-signed without an embedded certificate, or signed without an embedded certificate and re-signed with an embedded certificate.

20. A system for transferring information, the system comprising:

a first electronic device disposed at a first location to a third electronic device disposed at a third location via a second electronic device disposed at a second location, said first electronic device comprising a transmitter operable to transmit at least one of a signed document and an encrypted document to the second electronic device via a network, said second electronic device comprising:

a receiver operable to receive via the network the signed and the encrypted document from the first electronic device, a decryptor and a validator respectively operable to decrypt and validate the received document, a signor and an encryptor, said signer operable to re-sign the validated received document, said encryptor operable to select an algorithm from plurality of algorithms, the selected algorithm to be used by the second electronic device to decrypt the document, the encryptor operable to re-encrypt the decrypted received document using the determined algorithm, and a transmitter operative to transmit the re-signed and the re-encrypted document to the third electronic device via the network.

21. The system as recited ill claim 20, further comprising means for providing an error indication upon detection of an invalid the signature of the document.

22. The system as recited in claim 20 wherein the document is signed using a first digest algorithm and the validated received document is re-signed using a second signing digest algorithm, and wherein the first signing digest algorithm used to sign the document is different from the second signing digest algorithm used to re-sign the validated received document.

23. The system as recited in claim 20 wherein the received document is validated using a key from a trusted Certificate Authority and the transmitted document is encrypted and signed with a key from a different trusted Certificate Authority.

24. The system as recited in claim 20 wherein the received document is re-encrypted using a key having a different length than the key used to encrypt the transmitted document.

25. The system as recited in claim 20 wherein the document is signed with a certificate embedded in the document and re-signed without a certificate embedded in the document, or signed without a certificate embedded in the document and re-signed with a certificate embedded in the document.

26. The method as recited in claim 1, wherein information is known to the intermediate computer about the second computer prior to receiving the document signed and encrypted from the first location, and wherein the first location is different from the second location.

27. The method as recited ill claim 1, wherein the document is a non-video digital document.

28. The computer media as recited in claim 13, wherein the document is a non-video digital document.

29. The system as recited in claim 20 wherein said signer is operable to re-sign the validated received document using signing information received from the third electronic device.

30. The system as recited in claim 20 wherein said signer is operable to re-sign the validated received document using signing information embedded in the received decrypted document.

31. The system as recited in claim 20, wherein the document is a text document.

\* \* \* \* \*